Figure 1:
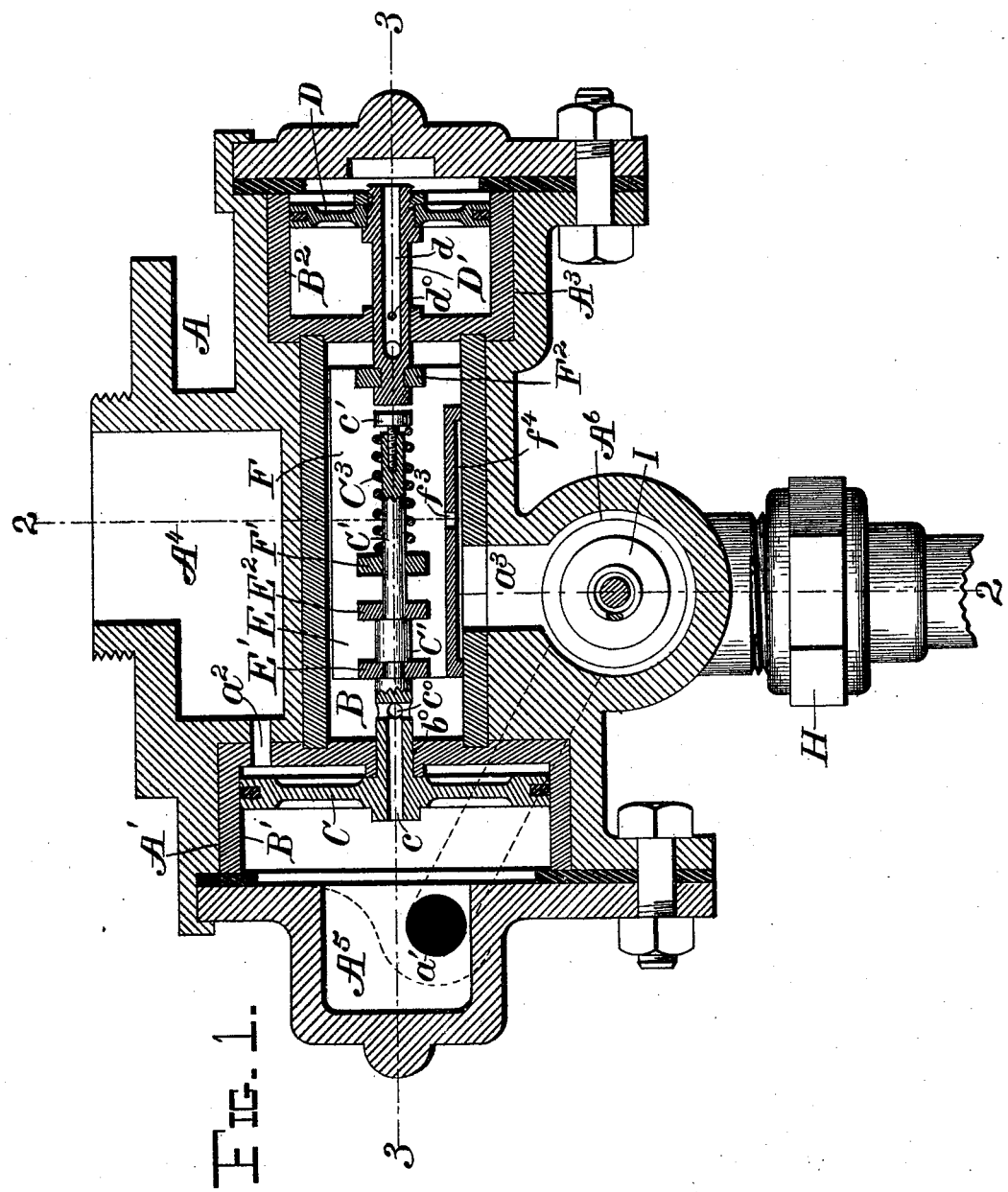

(No Model.)

3 Sheets—Sheet 1.

J. G. HOLCOMBE.
QUICK ACTION TRIPLE VALVE FOR FLUID PRESSURE BRAKES.

No. 582,205.              Patented May 11, 1897.

Witnesses
Percy C. Bowen
D. H. Blakelock

Inventor
J. G. Holcombe,
By Whitman & Wilkinson
Attorneys

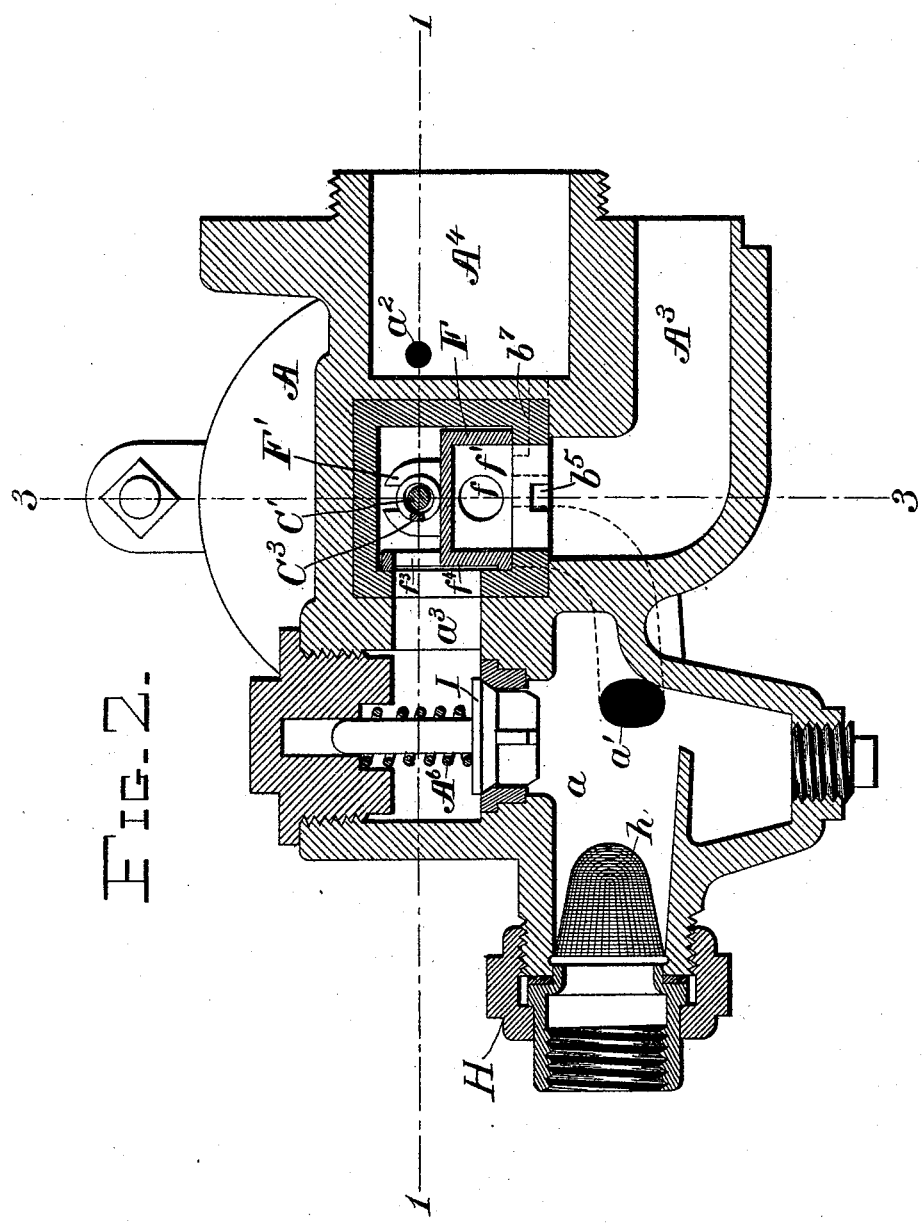

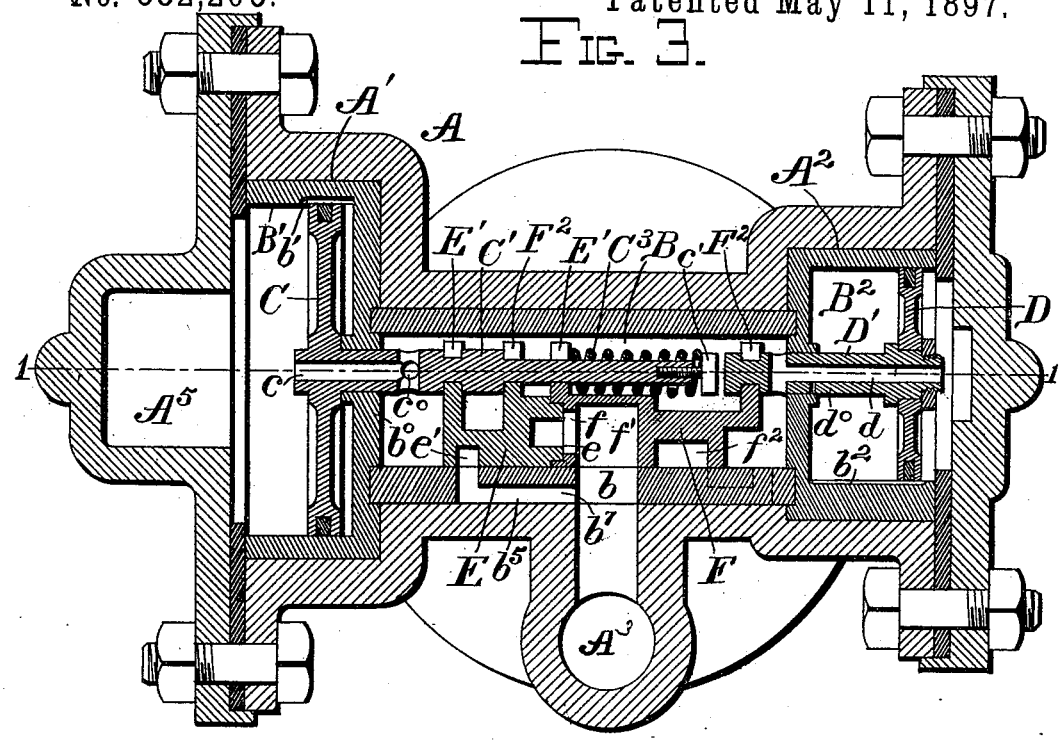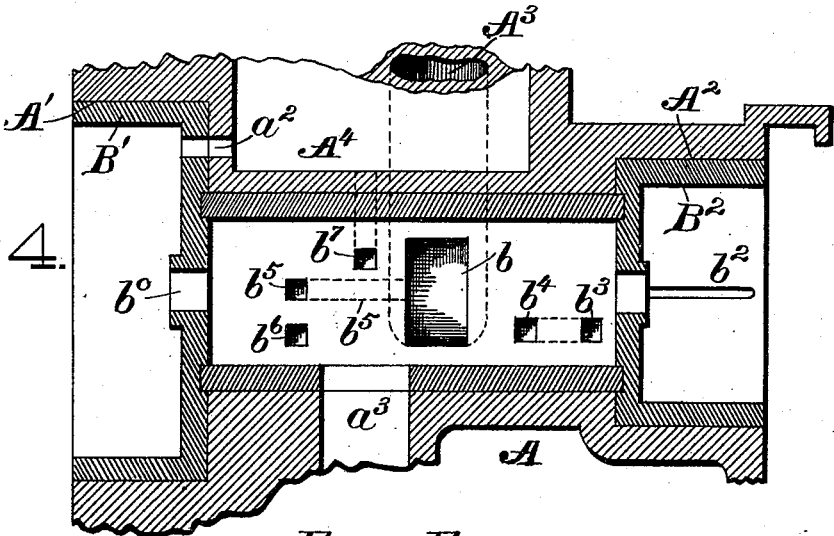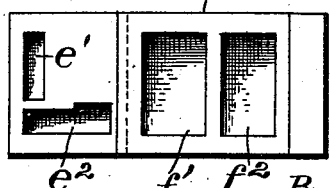

UNITED STATES PATENT OFFICE.

JOSEPH GALES HOLCOMBE, OF NEWPORT, OREGON, ASSIGNOR OF FORTY-NINE ONE-HUNDREDTHS TO ROYAL AUGUSTUS BENSELL, OF SAME PLACE.

QUICK-ACTION TRIPLE VALVE FOR FLUID-PRESSURE BRAKES.

SPECIFICATION forming part of Letters Patent No. 582,205, dated May 11, 1897.

Application filed August 22, 1896. Serial No. 603,633. (No model.)

*To all whom it may concern:*

Be it known that I, JOSEPH GALES HOLCOMBE, a citizen of the United States, residing at Newport, in the county of Lincoln and State of Oregon, have invented certain new and useful Improvements in Quick-Action Triple Valves for Fluid-Pressure Brakes; and I do hereby declare the following to be a full, clear, and exact description of the invention, such as will enable others skilled in the art to which it appertains to make and use the same.

This invention relates to quick-acting triple valves for use in connection with automatic-air-brake systems on railway-cars; and the nature thereof consists in certain modifications and improvements in the construction of the same hereinafter described and claimed.

Referring to the accompanying drawings, in which similar letters of reference designate corresponding parts in the several views, Figure 1 represents a horizontal sectional view of my improved valve, taken on the line 1 1 of Figs. 2 and 3. Fig. 2 represents a vertical transverse sectional view of the same, taken on the line 2 2 of Fig. 1. Fig. 3 represents a vertical longitudinal sectional view of the same, taken on the line 3 3 of Figs. 1 and 2. Fig. 4 is a plan view of the valve-seat, the valve being removed and the casing being shown in horizontal section on the line 1 1 of Figs. 2 and 3. Fig. 5 is an inverted plan view of the valve.

In each end of the main casing A is formed a recess $A'$ and $A^2$, in which are arranged cylinders $B'$ and $B^2$, respectively. The cylinder $B'$ is the larger to receive the main piston $c$, and has a short leakage-port $b'$ to allow the air to pass slowly from one side of the piston to the other. The cylinder $B^2$ is smaller and contains the governing-piston D and also has a leakage-port $b^2$ extending nearly its whole length.

The valve-chamber B is situated in the casing A between the two cylinders $B'$ and $B^2$, the bottom of the said valve-chamber constituting the valve-seat.

The valve is formed of two parts E and F, which fit together, as at $e$, thus closing the port $f$, which opens into the larger port $f'$ in the part F of the valve. When the valve is in the normal position, as shown in the drawings, this large port $f'$ is directly over and opens into a corresponding port $b$ in the valve-seat, which communicates with the passage $A^3$, leading to the brake-cylinder.

Both parts E and F of the valve have upwardly-extending lugs $E'$ and $E^2$ and $F'$ and $F^2$, slotted to receive the piston-rods $C'$ and $D'$. The rod $C'$ from the main piston C is secured in the slots in the lugs $E'$ and $E^2$ of the part E of the piston, as shown, after which it is reduced in size and extends freely through the lug $F'$ of the part F. In the extreme end of the piston-rod $C'$ is a large-headed screw $c'$, and between the head of this screw and the lug $F'$ is arranged a spiral spring $C^3$, which serves to keep the two parts E and F of the valve pressed together. The piston-rod $D'$ is secured in the slotted lug $F^2$, so that a movement of the main piston C will move the part E of the valve positively and will tend to move the part F of the valve through the medium of the spring $C^3$ and also the piston-rod $D'$ and piston D.

A chamber $f^2$ is formed in the bottom of the valve F, into which air is introduced through the ports $b^3$ $b^4$ for the purpose of partly balancing the valve, and a chamber $e^2$ is formed in the bottom of the valve E F, into which air is introduced through the port $b^7$ for the same purpose.

The air from the train-pipe enters through the coupling H and strainer $h$, filling the chamber $a$ and passing through the duct $a'$ to the chamber $A^5$ and the cylinder $B'$. Part of the air passes through the leakage-port $b'$ to the other side of the piston G and through the ports $a^2$ to the chamber $A^4$, which communicates with the auxiliary reservoir. Part of the air from the cylinder $B'$ will pass through the opening $c$ in the piston-rod $C'$, filling the valve-chamber B, and passing on through the opening $d$ in the piston-rod $D'$ to the front side of the piston D and through the leakage-port $b^2$, filling the cylinder $B^2$ behind the piston D. Thus the chambers $a$ and $A^5$, cylinders $B'$ and $B^2$, valve-chamber B, and the auxiliary reservoir will all be filled with air at train-pipe pressure. Some of the air from the chamber B will pass through the port $f^3$ into the space $f^4$ between the side of the valve and the side of the chamber B and through the large port $a^3$ to the check-valve chamber $A^6$, so that this chamber is also filled with air at train-pipe pressure.

The brake-cylinder is open to atmospheric pressure through the passage $A^3$, the port $b^5$, the port $e'$ in the valve, and the port $b^6$, which latter is open to the atmosphere.

Should a slight reduction be made in the train-pipe pressure, it will partly relieve the pressure on the back of the main piston C and also in the valve-chamber and on the front of the piston D. This will cause the air from the auxiliary reservoir to press the main piston C backward, drawing the valve F and the governing-piston D with it. The air in the cylinder $B^2$ back of the piston D, being at train-pipe pressure, will prevent the latter piston from being moved backward faster than the air can pass through the leakage-port $b^2$, and the spring $C^3$ is strong enough to prevent the two parts of the valve from separating under the pressure caused by a slight reduction in train-pipe pressure. Thus both the pistons and the two parts E and F of the valve will move backward slowly together. The first movement of the valve E F will close the ports $b^5$ and $b^6$, thus shutting the opening to the atmosphere, and the further movement of the valve will bring the large port $f'$ over the port $b^7$ from the auxiliary reservoir, thus admitting reservoir-air to the brake-cylinder to apply the brakes in the usual manner. As soon as the reservoir-pressure has been reduced below the train-pipe pressure the piston C will move forward a little, closing the port $b^7$ (from reservoir) and keeping the brake-cylinder at a stationary pressure. If more pressure is wanted, another slight reduction is made in the train-pipe pressure, when the pistons and valve will move backward again and allow a little more reservoir-air to enter the brake-cylinder.

For an emergency stop a sudden and greater reduction is made in the train-pipe pressure. This will relieve the pressure on the back of the piston C and on the front of the piston D. The air in the cylinder $B^2$ behind the piston D, being at train-pipe pressure and not being able to escape fast enough by the leakage-port $b^2$, will carry the piston forward far enough to cover the end of the leakage-port $b^2$, thus preventing the escape of the air from behind it. At the same time the piston C will be forced quickly backward by the reservoir-air, and these quick opposite movements of the pistons will overcome the tension of the spring $C^3$ and pull the part E away from the part F of the valve, thus opening the ports $f$ and $b^7$ and allowing the air from the reservoir to pass through the said ports $b^7$ and $f$ to the brake-cylinder. The port $f$, being very large in comparison with $c^0$, will drain the chambers B and $A^6$ of train-pipe pressure by expansion into the brake-cylinder before valve E has uncovered port $b^7$, which is also of restricted size. Thus the check-valve I will be raised and the train-pipe pressure will pass to brake-cylinder, together with reservoir-pressure from port $b^7$. The same movement of the valve E will close the ports $b^5$ and $b^6$ to the atmosphere, thus retaining the air at the combined reservoir and train-pipe pressure in the brake-cylinder to apply the brakes.

When the main piston C moves backward, the openings $c^0$ of the port $c$ in the piston-rod $C'$ will be drawn within the aperture $b^0$, through which the said piston-rod moves, and thus the air in the chamber B will be prevented from escaping to the train-pipe should the pressure in the latter be lower than in the valve-chamber B.

Should the pressure in chamber B fall below the train-pipe pressure, the check-valve I will be lifted by the latter and will allow the air from the train-pipe to pass into the valve-chamber B through the ports $a^3$ and $f^3$, and thus combine with the reservoir-air to apply the brakes.

A small aperture $d^0$ is made in the piston-rod $D'$, which when the piston D moves forward, as in the action for separating the two parts of the valve E F in the emergency stop, will be uncovered and will allow the air in the cylinder $B^2$ to leak out into the chamber B, as the pressure in the latter is reduced by reason of the expansion into the brake-cylinder. This will eventually allow the piston D and part F of the valve to follow the part E of the valve, but not until after the brakes have been applied with the full reservoir and train-pipe pressure combined.

To relieve the brakes, the pressure in the train-pipe is increased. This will move the piston C back to its normal position, closing the reservoir-port $b^7$ and opening the atmospheric ports $b^5$ and $b^6$ to allow the air from the brake-cylinder to escape to the atmosphere, thus restoring all parts to their normal position.

Having thus described my invention, what I claim, and desire to secure by Letters Patent of the United States, is—

1. In an automatic-brake system, the combination with a large cylinder provided with a leakage-port, a smaller cylinder also provided with a leakage-port, a valve-chamber between the two cylinders, pistons in the said cylinders, and rods from the pistons extending into the said valve-chamber; of the valve formed in two parts, one part connected with the main piston-rod, and the other part with the smaller piston-rod, and by a yielding connection with the main piston-rod, substantially as described.

2. In an automatic-brake system, the combination with a large cylinder provided with a short leakage-port, a smaller cylinder provided with a leakage-port extending nearly its whole length, a valve-chamber between the two cylinders, pistons in the said cylinders, and rods from the pistons extending into the said valve-chamber, of the valve formed in two parts, one part connected with the main piston-rod, and the other part connected with the smaller piston-rod, and by a spring connection with the main piston-rod, substantially as described.

3. In an automatic-brake system, the combination with a large cylinder provided with a leakage-port, a smaller cylinder also provided with a leakage-port, a valve-chamber between the two cylinders, pistons in the said cylinders, and rods from the pistons extending into the said valve-chamber; of the valve formed in two parts E and F, slotted lugs on each of the parts through which the piston-rods pass, the main piston-rod being secured to the lugs of the part E of the valve and passing through one of the lugs on the part F, a head on the end of the main piston-rod, and a spring interposed between the said head and the lug on the part F, and the rod from the smaller piston connected to the other lug on the part F, substantially as described.

4. In an automatic-brake system, the combination with a large cylinder provided with a leakage-port, a smaller cylinder also provided with a leakage-port, a valve-chamber between the two cylinders, pistons in the said cylinders, and rods from the pistons extending into the said valve-chamber; of the valve formed in two parts E and F, the part E connected with the main piston-rod, and the part F connected with the smaller piston-rod and with the main piston-rod by a yielding connection, the chambers $e^2$ and $f^2$ in the bottom of the two parts of the valve, and means for admitting air to the said chambers to partly balance the valve, substantially as described.

5. In an automatic-brake system, the combination with a large cylinder provided with a leakage-port, a smaller cylinder also provided with a leakage-port, a valve-chamber between the two cylinders, pistons in the said cylinders, rods from the pistons extending into the said chamber, and air-passages $c$ and $c^0$ and $d$ and $d^0$ in the said piston-rods; of the valve formed in two parts, one part connected with the main piston-rod, and the other part with the smaller piston-rod, and by a yielding connection with the main piston-rod, substantially as described.

6. In an automatic-brake system, the combination with a casing having a large cylinder, a small cylinder, and a valve-chamber therein; a passage $a'$ to conduct air from the train-pipe to the large cylinder, a passage $A^4$ leading to an auxiliary reservoir, a passage $a^2$ leading from the passage $A^4$ to the large cylinder, a passage $A^3$ leading to the brake-cylinder and opening through the ports $b$ and $b^5$ into the valve-chamber; of the valve formed in two parts E and F, the part F having a chamber $f'$ opening into the port $b$, and a port $f$ kept normally closed by the part E of the valve, and means for operating the two parts of the valve, substantially as described.

7. In an automatic-brake system, the combination with a casing having a large cylinder, a small cylinder, and a valve-chamber therein; a coupling H for connecting the said casing with the train-pipe, a strainer $h$ over the opening through the said coupling, a passage $a'$ to conduct air from the train-pipe to the large cylinder, a passage $A^4$ leading to an auxiliary reservoir, a passage $a^2$ leading from the passage $A^4$ to the large cylinder, a passage $A^3$ leading to the brake-cylinder and opening through the ports $b$ and $b^5$ into the valve-chamber; of the valve formed into two parts E and F, the part F having a chamber $f'$ opening into the port $b$, and a port $f$ kept normally closed by the part E of the valve, and means for operating the two parts of the valve, substantially as described.

8. In an automatic-brake system, the combination with a casing having a large cylinder, a small cylinder, a passage connecting with the train-pipe, a passage connecting with an auxiliary reservoir, and a passage connecting with the brake-cylinder, a valve-chamber B, a check-valve chamber $A^6$, a port $a^3$ from the check-valve chamber to the valve-chamber B, and a check-valve I in the said check-valve chamber; of a valve formed in two parts E and F, the part F having a port $f^3$ arranged to open into the port $a^3$ from the check-valve chamber, a leakage-space $f^4$ formed in the sides of the two parts of the valve and communicating with the port $a^3$, and means for operating the said valve E F, substantially as described.

9. The valve formed of two parts, E and F, having upwardly-extending lugs E', $E^2$, F' and $F^2$ slotted to receive the piston-rods, the rod C' from the main piston secured in the part E and extending through the part F, the headed screw $c'$ in the end of the said piston-rod, the spiral spring $C^3$ and the piston-rod D' secured in the slotted lug $F^2$, and the piston D, substantially as described.

10. In an automatic-brake system the combination with a casing having a large cylinder, a small cylinder, a passage connecting with an auxiliary reservoir, and a passage connecting with the brake-cylinder, a valve-chamber B, a port $b$, from the brake-cylinder passage, a port $b^5$ also from the brake-cylinder passage, a port $b^7$ from the auxiliary-reservoir passage, a port $b^6$ opening to the atmosphere, and ports $b^3$ and $b^4$ open to each other, all of the said ports open to the valve-chamber B; of a valve formed in two parts E and F fitting together, the part F having a port $f$ closed by the part E of the valve, a port $f'$ communicating with the port $f$ and open to the port $b$, and a chamber $f^2$ open to the port $b^4$, and the valve E having a port $e'$ open to the ports $b^5$ and $b^6$ and a chamber $e^2$ open to the port $b^7$; and means for operating the said valve E F to open or close the said ports, substantially as described.

In testimony whereof I affix my signature in presence of two witnesses.

JOSEPH GALES HOLCOMBE.

Witnesses:
 JNO. BUCKLEY,
 WM. MATTHEWS.